US012674023B2

(12) United States Patent (10) Patent No.: US 12,674,023 B2
Niu et al. (45) Date of Patent: Jul. 7, 2026

(54) HYDROXYL-TERMINATED POLYESTER RESIN, PREPARATION METHOD THEREFOR AND USE THEREOF

(71) Applicant: KINTE MATERIALS SCIENCE AND TECHNOLOGY CO., LTD., Guangdong (CN)

(72) Inventors: Xiaoxue Niu, Guangdong (CN); Zhiping Ma, Guangdong (CN); Li Zeng, Guangdong (CN); Jing Xie, Guangdong (CN); Yong Li, Guangdong (CN)

(73) Assignee: KINTE MATERIALS SCIENCE AND TECHNOLOGY CO., LTD., Guangdong (CN)

( * ) Notice: Subject to any disclaimer, the term of this patent is extended or adjusted under 35 U.S.C. 154(b) by 760 days.

(21) Appl. No.: 17/923,827

(22) PCT Filed: Aug. 13, 2020

(86) PCT No.: PCT/CN2020/108898
§ 371 (c)(1),
(2) Date: Nov. 7, 2022

(87) PCT Pub. No.: WO2022/032570
PCT Pub. Date: Feb. 17, 2022

(65) Prior Publication Data
US 2023/0174710 A1 Jun. 8, 2023

(51) Int. Cl.
*C08G 63/183* (2006.01)
*C08G 63/85* (2006.01)
*C08G 63/91* (2006.01)
*C09D 167/02* (2006.01)

(52) U.S. Cl.
CPC ........... *C08G 63/183* (2013.01); *C08G 63/85* (2013.01); *C08G 63/916* (2013.01); *C09D 167/02* (2013.01)

(58) Field of Classification Search
None
See application file for complete search history.

(56) References Cited

U.S. PATENT DOCUMENTS

| | | | |
|---|---|---|---|
| 5,089,598 A | 2/1992 | Hawkins et al. | |
| 2007/0128389 A1* | 6/2007 | Kezios | B32B 27/36 |
| | | | 428/35.7 |
| 2017/0096581 A1* | 4/2017 | Spilman | C08G 18/246 |

FOREIGN PATENT DOCUMENTS

| | | |
|---|---|---|
| CN | 104311806 A | 1/2015 |
| CN | 106832236 A | 6/2017 |
| CN | 107868235 A | 4/2018 |
| CN | 108912317 A | 11/2018 |
| CN | 109293904 A | 2/2019 |
| CN | 109517150 A | 3/2019 |
| CN | 110204702 A | 9/2019 |
| CN | 110790909 A | 2/2020 |

OTHER PUBLICATIONS

English Machine Translation of Ying et al (CN 104311806 B) (Year: 2025).*
English Machine Translation of Lin et al (CN 106832236 A) (Year: 2025).*
Chemeo, Chemical properties of CAS 77-99-6 (Year: 2010).*
English Translation of Office Action for CN Application 202080003832.2 dated Aug. 3, 2022.
English Translation of Search Report for CN Application 202080003832.2.
Loshev et al. "Synthesis of Body Structure Polyester" Synthetic Resin Chemistry, Feb. 28, 1957, pp. 229-230.

* cited by examiner

*Primary Examiner* — Randy P Gulakowski
*Assistant Examiner* — Holley Grace Hester
(74) *Attorney, Agent, or Firm* — Thompson Coburn LLP; Steven M. Ritchey

(57) ABSTRACT

A hydroxyl-terminated polyester resin, a preparation method therefor and use thereof. The hydroxyl-terminated polyester resin is composed of the following raw materials in parts by mass: 25-50 parts of a diol, 40-70 parts of a dibasic acid, 0.1-2 parts of glycidyl tertcarbonate, 0.5-4 parts of a hydroxylation reagent, 0.08-0.3 parts of a catalyst and 0.2-0.5 parts of an antioxidant. The acid value of the polyester resin is 1-8 mgKOH/g, the hydroxyl value is 20-30 mgKOH/g, the melt viscosity at 200° C. is 9000-13000 mPa·s, the reactivity at 180° C. is 410-520 s, the glass transition temperature is 53-59° C., and the softening point is 101-106° C.

13 Claims, No Drawings

1

HYDROXYL-TERMINATED POLYESTER RESIN, PREPARATION METHOD THEREFOR AND USE THEREOF

CROSS-REFERENCE TO RELATED APPLICATIONS

The present application is a national phase entry under 35 USC § 371 of International Application PCT/CN2020/108898, filed on Aug. 13, 2020, the entire disclosure of which is incorporated herein by reference.

TECHNICAL FIELD

The present disclosure belongs to the field of high polymer materials, and particularly relates to a hydroxyl-terminated polyester resin, preparation method therefor and use thereof.

BACKGROUND ART

A hydroxyl-terminated polyester resin is an important component of an isocyanate cured powder coating, and the powder coating layer has not only high ornamental and good physical properties, but also good resistance to chemicals, especially difficult to yellowing, excellent weather resistance and excellent light fastness, which can be widely applied to home appliances such as refrigerators, washing machines and air conditioners, and industries such as advanced furniture, automobiles and motorbikes. With the rapid development of powder coatings, the demands for mid/high-end isocyanate cured powder coatings and key polyester resins are gradually increasing. BASF in Germany has applied isocyanate cured powder systems to car bodies and window frames, and in the United States it has been applied to vehicles requiring high impact resistance. Although China is a large producer of polyester resins, polyester resin for high-end functional isocyanate cured powder coating still needs to be imported in large quantities. Thus it is urgent to develop a high-end functional hydroxyl-terminated polyester resin with low B1530 consumption and outstanding comprehensive performance to solve the problem of relatively single market supply and demand. Currently, the hydroxyl value of the hydroxyl-terminated polyester resin for the isocyanate cured powder coating is mainly larger than 30 mgKOH/g. Patent CN108912317A discloses a method for synthesizing low-viscosity hydroxyl-terminated polyester resin with a hydroxyl value range of 30-50 mgKOH/g, the high hydroxyl value of the resin and the high proportion of a curing agent in the powder coating formula pushed up the cost of the coating and affected the market promotion of this type of coatings. Patent CN109517150A proposes a high-weather-resistant, high-solid-content and low-viscosity hydroxyl-terminated polyester resin, which is applied to the field of high-end coiling coatings, however, the Tg of the polyester resin synthesized by using this method is relatively low, and the storage stability is poor.

Therefore, it is necessary to provide hydroxyl-terminated polyester resin with a low hydroxyl value. The isocyanate cured powder coating prepared by using this polyester resin has high ornamental and good physical properties, especially impact stability and excellent weather resistance.

SUMMARY

Aiming at solving the problems of low curing agent dosage, unstable mechanical property and poor weather resistance of coatings, the objective of the present disclosure is to provide hydroxyl-terminated polyester resin with a low hydroxyl value, and a preparing method thereof, and provide a coating prepared by using the hydroxyl-terminated polyester resin, which has good mechanical property and excellent weather resistance.

The present disclosure adopts the following technical solution:

The first aspect of the present disclosure provides:

A hydroxyl-terminated polyester resin, comprising the following components in parts by mass: 25-50 parts of diol, 40-70 parts of dibasic acid, 0.1-2 parts of glycidyl tertcarbonate, 0.5-4 parts of a hydroxylation reagent, 0.08-0.3 parts of a catalyst and 0.2-0.5 parts of an antioxidant.

Preferably, the hydroxyl value of the above hydroxyl-terminated polyester resin is 20-30 mgKOH/g, and the acid value of the above hydroxyl-terminated polyester resin is 1-8 mgKOH/g. The hydroxyl value of the hydroxyl-terminated polyester resin is controlled to 20-30 mgKOH/g so that it is controlled within a reasonable low hydroxyl value range, thereby reducing the amount of curing agent in the subsequent coating application, while improving the mechanical property and weather resistance of the coating.

Preferably, the melt viscosity of the above hydroxyl-terminated polyester resin at 200° C. is 9,000-13,000 mPa·s.

Preferably, the reactivity of the above hydroxyl-terminated polyester resin at 180° C. is 410 s-520 s, the glass transition temperature of the above hydroxyl-terminated polyester resin is 53° C.-59° C., and the softening point of the above hydroxyl-terminated polyester resin is 101° C.-106° C.

Preferably, the above diol is at least one selected from the group consisting of neopentyl glycol, 1,4-cyclohexanedimethanol, ethylene glycol, 2-ethyl-2-butyl-1,3-propanediol, 1,2-propanediol, 2-methyl-1,3-propanediol and 1,6-hexanediol.

Preferably, the diol consists of the following components in percentage by weight: 60%-97% of neopentyl glycol, 1%-25% of 1,4-cyclohexanedimethanol, 0-25% of ethylene glycol, 0-20% of 2-ethyl-2-butyl-1,3-propanediol, 0-10% of 1,2-propanediol, 0-10% of 2-methyl-1,3-propanediol and 0-10% of 1,6-hexanediol.

Preferably, the diol consists of the following components in percentage by weight: 65%-95% of neopentyl glycol, 3%-20% of 1,4-cyclohexanedimethanol, 0-23% of ethylene glycol, 0-15% of 2-ethyl-2-butyl-1,3-propanediol, 0-15% of 1,2-propanediol, 0-15% of 2-methyl-1,3-propanediol and 0-15% of 1,6-hexanediol. Reasonable addition of a variety of diols improves the stability of the mechanical property of the polyester resin, while optimizing the cross-linking density and improving the weather resistance.

Preferably, the above dibasic acid is at least one selected from the group consisting of an aromatic dibasic acid and an aliphatic dibasic acid.

Preferably, the above aromatic dibasic acid comprises terephthalic acid and isophthalic acid, wherein the mass of isophthalic acid is 0-15% of that of aromatic dibasic acid.

Preferably, the above aliphatic dibasic acid is at least one selected from the group consisting of 1,4-succinic acid, 1,6-hexanedioic acid, 1,10-decanedioic acid, dodecanedioic acid and 1,4-cyclohexanedicarboxylic acid.

Preferably, the above hydroxylation reagent is at least one selected from the group consisting of 1,2,3,4,5-pentitol, 1,2,3,4,5,6-hexanehexol and 2,2-dihydroxymethyl-butanol.

Preferably, the above catalyst is an organic tin catalyst.

Preferably, the above organic tin catalyst is at least one selected from the group consisting of monobutyl tin oxide and monobutyl tin triisooctanoate.

Preferably, the above antioxidant is at least one selected from the group consisting of antioxidant 1010 antioxidant 1010 (Tetrakis[β-(3,5-di-tert-butyl-4-hydroxyphenyl)propionic acid]pentaerythritol ester), antioxidant 1076 (N-Octadecyl 3-(3,5-di-tert-butyl-4-hydroxyphenyl)propionate) and antioxidant DSTP (di(octadecyl)thiodipropionate).

The second aspect of the present disclosure provides:

A method for preparing the above hydroxyl-terminated polyester resin, comprising the following steps of:

(1) carrying out polycondensation reaction of diol, dibasic acid, glycidyl tertcarbonate and a catalyst in an inert atmosphere to obtain a primary polymer;

(2) when the acid value of the primary polymer obtained in step (1) is 10-25 mgKOH/g, vacuumizing, and continuing polycondensation reaction to obtain a condensation polymer; and (3) when the acid value of the condensation polymer obtained in step (2) is 8-25 mgKOH/mg, carrying out hydroxylation reaction until the acid value of the product obtained by hydroxylation reaction is 1-8 mgKOH/g and the hydroxyl value of the product is 20-30 mgKOH/g, at this moment, adding an antioxidant, and then mixing to obtain the hydroxyl-terminated polyester resin.

Preferably, the temperature of the above polycondensation reaction in step (1) is 230° C.-240° C.

Preferably, the time of the above polycondensation reaction in step (1) is 3 h-5 h.

Preferably, the vacuum degree of the above vacuum in step (2) is 0.08-0.1 MPa. Vacuumizing the system in step (1) can pump unreacted substances or small polymers out, thus improving the polycondensation degree of the polycondensation reaction in step (2), and enhancing the cross-linking density. Meanwhile, through the above vacuumizing operation, the molecular weight distribution of the condensation polymer can be also improved, and the molecular weight can be controlled in a reasonable range, so that the final product can reach a hydroxyl value of 20-30 mgKOH/g and a melt viscosity at 200° C. of 9000-13000 mPa·s. However, there is no vacuumizing operation in the prior art, which leads to excessive alcohol substances that are not completely reacted in the synthesized polyester resin, resulting in low viscosity and low cross-linking density of the finally synthesized product, and poor comprehensive performance of the coating subsequently prepared from this product.

Preferably, the time of the above polycondensation reaction in step (2) is 50 min-120 min.

Preferably, in the above step (3), the temperature of the hydroxylation reaction is 215° C.-230° C., and the time of the hydroxylation reaction is 1 h-3 h.

Preferably, the temperature of the above mixing in step (3) is 200° C.-230° C.

Preferably, the time of the above mixing in step (3) is 10 min-40 min.

The third aspect of the present disclosure provides:

A coating, comprising hydroxyl-terminated polyester resin, the hydroxyl-terminated polyester resin being the above hydroxyl-terminated polyester resin, or being prepared by the method for preparing the above hydroxyl-terminated polyester resin.

Preferably, the above coating comprises the hydroxyl-terminated polyester resin, isocyanate, pigment and other additives, the hydroxyl-terminated polyester resin is the above hydroxyl-terminated polyester resin, or is prepared by the method for preparing the above hydroxyl-terminated polyester resin, wherein the other additives comprise leveling agent, degassing agent, etc.

The present disclosure has the beneficial effects:

(1) through a reasonable formula and selection of catalysts, the hydroxyl-terminated polyester resin has the acid value of 1-8 mgKOH/g, the hydroxyl value of 20-30 mgKOH/g, the melt viscosity at 200° C. of 9,000-13,000 mPa·s, the reactivity at 180° C. of 410 s-520 s, the glass transition temperature of 53-59° C., and the softening point of 101-106° C. The polyester resin has an ideal glass transition temperature and hydroxyl value, the powder coating prepared from the polyester resin and a curing agent such as isocyanate (B1530) as well as other materials has good comprehensive performance while the powder coating has stable mechanical property and excellent weather resistance.

(2) in the preparation method of the hydroxyl-terminated polyester resin of the present disclosure, the polycondensation degree of the polycondensation reaction of the reaction system can be improved by adding the vacuumizing operation when the reaction system reaches a special acid value, thereby improving the cross-linking density; meanwhile, through the above vacuumizing operation, the molecular weight distribution of the condensation polymer can be also improved, and the molecular weight can be controlled in a reasonable range, so that the final product can reach a hydroxyl value of 20-30 mgKPH/g and a melt viscosity at 200° C. of 9000-13000 mPa·s.

DETAILED DESCRIPTION OF THE EXAMPLES

To make the inventive purpose, technical solutions and its technical effect of the present disclosure more clear, the present disclosure will be further described in detail in combination with specific examples. It should be understood that specific examples described in the description are only to explain the present disclosure but not intended to limit the present disclosure.

According to compositions of hydroxyl-terminated polyester resins of examples 1-6 and contrasts 1-2 in Table 1, diol, glycidyl tertcarbonate, aromatic dibasic acid, aliphatic dibasic acid and a catalyst were added into a reaction kettle in the proportion, nitrogen was introduced for protection, temperature was risen to about 182-184° C. by a program, at this moment, esterified water started to be generated and discharged by distillation, then the above mixture continued to be slowly heated to 230-240° C., heat preservation was performed for 2-5 h at 230-240° C. until more than 90% of esterified water was discharged, and the system became clear and transparent. The acid value was tested as 10-25 mgKOH/g. Vacuum polycondensation was performed, the vacuum degree was adjusted to 0.08-0.1 MPa for reaction, wherein the vacuum polycondensation reaction lasted for 80 min in examples 1-6, the vacuum polycondensation reaction lasted for 118 min in contrast 1, the vacuum polycondensation reaction lasted for 90 min in contrast 2, the acid value was tested as 8-15 mgKOH/g, the temperature was reduced to 215° C.-230° C. for hydroxylation reaction, and heat preservation was performed for 1-3 h at this temperature. When the acid value was 1-8 mgKOH/g, the hydroxyl value was 20-30 mgKOH/g and the melt viscosity at 200° C. was 9,000-13,000 mPa·s, the polycondensation reaction was completed. The temperature was reduced to 200° C.-230° C. to obtain a melting condensation polymer. An antioxidant was added into the melting condensation polymer, the above materials were stirred and mixed for 10-40 min, discharged and cooled to obtain the hydroxyl-terminated polyester resin.

6

4-dimethylaminopyridine in tetrahydrofuran solution) and 10 mL of acetylation solution (1 L of tetrahydrofuran containing 125 mL of acetic anhydride) were respectively measured with a pipette and added into the conical flask to

TABLE 1

Compositions of hydroxyl-terminated polyester resins in examples 1-6 and contrasts 1-2

| Components (in parts by mass) | | Example 1 | Example 2 | Example 3 | Example 4 | Example 5 | Example 6 | Contrast 1 | Contrast 2 |
|---|---|---|---|---|---|---|---|---|---|
| First feed | | | | | | | | | |
| Diol | Neopentyl glycol | 25 | 33.8 | 35 | 27 | 25.8 | 37 | 32 | 33 |
| | Ethylene glycol | 8 | — | — | 4 | 8 | — | 4 | — |
| | 1,4-cyclohexanedimethanol | 2 | 1.5 | 8 | 4 | 3 | 2 | — | 4 |
| | 2-ethyl-2-butyl-1,3-propanediol | — | 5 | — | — | 0.5 | — | — | 3 |
| | 1,2-propanediol | — | — | 1 | 2.5 | — | — | — | — |
| | 2-methyl propanediol | 1 | — | — | — | — | 0.7 | — | — |
| | 1,6-hexanediol | — | 1 | — | — | — | — | 3 | — |
| | Glycidyl tertcarbonate | 1 | 0.2 | 1 | 0.3 | 0.3 | 0.1 | — | — |
| Aromatic dibasic acid | Terephthalic acid | 55 | 58 | 55 | 57 | 58 | 57 | 57 | 55 |
| | Isophthalic acid | 5 | — | 5 | 3 | — | 2 | 4 | — |
| Fatty dibasic acid | 1,4-succinic acid | — | 2 | — | — | 5 | — | — | — |
| | 1,6-hexanedioic acid | 4 | — | — | — | — | — | — | 4 |
| | 1,10-decanedioic acid | — | 1.5 | 4 | — | — | — | — | — |
| | Dodecanedioic acid | — | — | — | 1 | — | 3 | — | — |
| | 1,4-cyclohexanedicarboxylic acid | — | — | 2 | 2 | — | — | 2 | — |
| Catalyst | Monobutyl tin oxide | 0.09 | — | 0.09 | 0.09 | — | — | 0.09 | — |
| | Monobutyl tin triisooctanoate | — | 0.23 | — | — | 0.23 | 0.23 | — | 0.23 |
| Second feed (hydroxylation reaction) | | | | | | | | | |
| Hydroxylation reagent | 2,2-dihydroxymethyl butanol | — | — | — | 1 | — | 0.8 | 1 | 2.3 |
| | 1,2,3,4,5-pentitol (xylitol) | 0.88 | 1.5 | — | — | 0.6 | 0.6 | — | — |
| | 1,2,3,4,5,6-hexanehexol (sorbitol) | — | — | 1.2 | 0.7 | 0.5 | — | — | — |
| Third feed (antioxidant added) | | | | | | | | | |
| Antioxidant | Antioxidant 1076 | 0.23 | 0.23 | — | 0.23 | — | — | 0.23 | — |
| | Antioxidant 1010 | — | — | 0.23 | — | 0.23 | 0.23 | — | 0.23 |
| | Antioxidant DSTP | 0.23 | 0.23 | 0.23 | 0.23 | 0.23 | 0.23 | 0.23 | 0.23 |

Contrast 3: according to compositions of the hydroxyl-terminated polyester resin of example 1, diol, glycidyl tertcarbonate, aromatic dibasic acid, aliphatic dibasic acid and a catalyst were added into a reaction kettle in the proportion, nitrogen was introduced for protection, temperature was risen to about 184° C. by a program, at this moment, esterified water started to be generated and discharged by distillation, then the above mixture continued to be slowly heated to 235° C., heat preservation was performed for 3.5 h at 235° C. until more than 90% of esterified water was discharged, and the system became clear and transparent. The acid value was tested as 10-25 mgKOH/g. Polycondensation was performed for 50 min-120 min until the temperature was 230° C., the hydroxylation reaction was performed, heat preservation was performed for 2 h at this temperature so as to complete the polycondensation reaction, and then the temperature was reduced 215° C. to obtain a melting condensation polymer, an antioxidant was added into the melting condensation polymer, and the above materials were stirred and mixed for 30 min, discharged and cooled to obtain the hydroxyl-terminated polyester resin.

Performance testing was carried on the hydroxyl-terminated polyester resins prepared in examples 1-6 and contrasts 1-3, in which:

The measurement method of the hydroxyl value of the hydroxyl-terminated polyester resin was as follows: the prepared hydroxyl-terminated polyester resins were weighed in corresponding weights according to Table 2 and put in a 250 mL conical flask, then 20 mL of tetrahydrofuran was added into the flask to dissolve the hydroxyl-terminated polyester resin, then 25 mL of catalyst solution (10 g/L be evenly shaken, and underwent standing for 5 min at room temperature; then 20 mL of hydrolysis solution (prepared in a volume ratio of tetrahydrofuran to distilled water being 4:1) was added, evenly shaken (sometimes turbidity occurred) and kept for 30 min at room temperature, and shaken once every 5 min; 25 mL of tetrahydrofuran and 5 drops of phenolphthalein solution (prepared in a proportion of 10 g phenolphthalein/1 L anhydrous ethanol) were added, titration was performed using 0.35N potassium hydroxide-ethanol solution, and the end point is reached when the color of the solution became red from colorless. A blank solution was prepared for titration test to test the acid value of the hydroxyl-terminated polyester resin.

Calculation of Hydroxyl Value:

$$OH = \frac{V_2 - V_1 * N * 56.1}{M} + AV$$

wherein, $V_1$: the volume of the potassium hydroxide solution consumed by the hydroxyl-terminated polyester resin;

$V_2$: the volume of the potassium hydroxide solution consumed by the blank solution;

N: the concentration of the potassium hydroxide solution;

M: the mass of the hydroxyl-terminated polyester resin sample;

AV: the acid value of the hydroxyl-terminated polyester resin sample.

TABLE 2

| Sampling quality table of hydroxyl value measurement samples of resins | | | | | | |
|---|---|---|---|---|---|---|
| Hydroxyl value range (mgKOH/g) | <15 | 15~25 | 25~50 | 50~100 | 100~200 | 200~400 |
| Sample mass (g) | 10 | 5 | 3 | 1.5 | 1 | 0.5 |
| Precision (g) | 0.001 | 0.001 | 0.001 | 0.001 | 0.0001 | 0.0001 |

The measurement method of the acid value of the hydroxyl-terminated polyester resin was as follows: 5 g of hydroxyl-terminated polyester resin was weighed and put into a conical flask with accurate of 1 mg, 30 mL of methylbenzene-ethanol mixed solvent was added so that the hydroxyl-terminated polyester resin was completely dissolved (if being not dissolved at room temperature, it could be properly heated under the environment with good ventilation, but the solution needed to be cooled to room temperature before titration). 3-5 drops of phenolphthalein indicator solution were added into the sample solution, then the ethanol solution of potassium hydroxide was immediately titrated until red color appeared, the end point was reached if the red color did not disappear in 30 s, and the volume of the consumed potassium hydroxide solution was recorded. A parallel blank test was performed, and steps were the same as described above.

Calculation of Acid Value:

$$\text{Acid value} = \frac{(V - V_0) * N * 56.1}{m}$$

wherein, m: the mass of the hydroxyl-terminated polyester resin sample;

V: the volume of the potassium hydroxide solution consumed by the hydroxyl-terminated polyester resin;

$V_0$: the volume of the potassium hydroxide solution consumed by the blank test;

N: the concentration of the potassium hydroxide solution.

The performance test results of the hydroxyl-terminated resin are as shown in table 3.

ing time in examples 1-6 is less than that of the contrasts 1-2, and the contrast 3 is not vacuumized, so the viscosity and glass transition temperature of the obtained polyester resin are both low, indicating that the cross-linking density of the obtained polyester resin is low, and there are problems such as poor storage stability of the polyester resin.

264 g of polyester resin obtained in examples 1-6 and contrasts 1-3, 36 g of curing agent B1530 (purchased from Evonik Degussa Specialty Chemicals (Shanghai) Co., Ltd.), 165 g of titanium dioxide (purchased from Panzhihua Dongfang Titanium Industry Co., Ltd.), 6 g of leveling agent (purchased from Ningbo Nanhai Chemical Co., Ltd.), 3 g of brightener 701 (purchased from Ningbo Nanhai Chemical Co., Ltd.), 3 g of defoamer 703 (purchased from Zhaoqing Shiying Coating Materials Co., Ltd.) were respectively weighed, and then the powder coating was prepared by melting, extruding, sheeting and crushing with a screw extruder and passing through a 180 mesh powder sieve.

Product Effect Test:

The powder coatings obtained in examples 1-6 and contrasts 1-3 were sprayed onto a metal plate subjected to surface treatment (phosphatization) with an electrostatic spray gun, with a film thickness being about 70 μM. The coating was cured at 200° C./15 min, and then performance test was carried out.

Test the gloss in accordance with GB/T9754-2007;

Conduct gelling time test in accordance with GB/T16995-1997;

Conduct impact test in accordance with T/GDTL 004-2018;

Conduct horizontal flow test in accordance with GB6554-1986;

Conduct lamp A accelerated aging test in accordance with GB/T14522-2008.

TABLE 3

| Performance test results of hydroxyl-terminated resins in examples 1-6 and contrasts 1-3 | | | | | | | | | |
|---|---|---|---|---|---|---|---|---|---|
| Index | Example 1 | Example 2 | Example 3 | Example 4 | Example 5 | Example 6 | Contrast 1 | Contrast 2 | Contrast 3 |
| Hydroxyl value mgKOH/g | 23.3 | 25.0 | 24.7 | 29.1 | 27.2 | 21.4 | 24.3 | 26.7 | 28.5 |
| Viscosity (200° C.)/mPa · s | 9270 | 12150 | 12420 | 10820 | 11140 | 10660 | 10210 | 11480 | 2740 |
| Reactivity (180° C.)/s | 492 | 419 | 441 | 435 | 457 | 514 | 483 | 406 | 816 |
| Glass transition temperature/° C. | 55.3 | 54.8 | 53.4 | 57.5 | 58.6 | 54.1 | 55.7 | 56.2 | 50.8 |
| Softening temperature/° C. | 103 | 102 | 101 | 105 | 106 | 102 | 103 | 104 | 96 |

Result analysis: it can be seen from examples 1-6 and contrasts 1-3 described above that polyester resins with corresponding viscosity ranges are obtained, the vacuumiz- The performance test results of powder coating layers prepared by examples 1-6 and contrasts 1-3 are as shown in Table 4.

TABLE 4

| Performance test results of power coating layers prepared in examples 1-6 and contrast 1-3 | | | | | | | | | |
|---|---|---|---|---|---|---|---|---|---|
| Component | Example 1 | Example 2 | Example 3 | Example 4 | Example 5 | Example 6 | Contrast 1 | Contrast 2 | Contrast 3 |
| Coating layer appearance | Smooth | Smooth | Smooth | Smooth | Smooth | Smooth | Smooth | Un-smooth | Smooth |
| Gloss % | 90.9 | 90.5 | 91.5 | 90.4 | 91.9 | 91.3 | 90.4 | 90.8 | 91.2 |
| Gelling time at 180° C./s | 705 | 575 | 621 | 603 | 645 | 736 | 790 | 532 | 964 |
| Impact/70 cm | Qualified in both positive and negative | Qualified in both positive and negative | Qualified in both positive and negative | Qualified in both positive and negative | Qualified in both positive and negative | Qualified in both positive and negative | Crack in both positive and negative | Qualified in both positive and negative | Crack in both positive and negative |
| Horizontal flow/m | 30 | 28.5 | 29.5 | 29 | 29.5 | 30.5 | 31 | 27.5 | 35 |
| Lamp A * 1,000 h (gloss retention (%)) | 99.9 | 100 | 99.9 | 99.8 | 100 | 100 | 98.6 | 99.3 | 70.2 |
| Lamp A * 2,000 h (gloss retention (%)) | 85.3 | 87.1 | 87.9 | 88.5 | 85.7 | 86.4 | 68.5 | 72.6 | 28.4 |

Result analysis: the powder coating layers prepared in examples 1-6 have better mechanical property and more excellent weather resistance compared with the conventional powder polyester coating layers in contrasts 1-3. After accelerated ageing under lamp A for 1,000 h, almost all the light retention rate can be maintained at 100% without light gloss; after accelerated ageing under lamp A for 2,000 h, the light retention rate can be maintained at more than 85%; all the light retention rates are better, which can better meet the requirement of the market.

The above examples are preferred embodiments of the present disclosure, but embodiments of the present disclosure are not limited to the above examples, other any variations, modifications, replacements, combinations and simplifications made without departing from the spirit and principle of the present disclosure should be included within the protective scope of the present disclosure.

What is claimed is:

1. A hydroxyl-terminated polyester resin consisting of the following components in parts by mass: 25-50 parts of diol, 40-70 parts of dibasic acid, 0.1-2 parts of glycidyl tertcarbonate, 0.5-4 parts of a hydroxylation reagent, 0.08-0.3 parts of a catalyst, and 0.2-0.5 parts of an antioxidant, wherein:

the diol consists of the following components in percentage by weight: 60%-97% of neopentyl glycol, 1%-25% of 1,4-cyclohexanedimethanol, 0-25% of ethylene glycol, 0-20% of 2-ethyl-2-butyl-1,3-propanediol, 0-10% of 1,2-propanediol, 0-10% of 2-methyl-1,3-propanediol and 0-10% of 1,6-hexanediol;

the dibasic acid is at least one selected from the group consisting of an aromatic dibasic acid and an aliphatic dibasic acid; the aromatic dibasic acid comprises terephthalic acid and isophthalic acid, wherein the mass of isophthalic acid accounts for 0-15% of the mass of aromatic dibasic acid; the aliphatic dibasic acid is at least one selected from the group consisting of 1,4-succinic acid, 1,6-hexanedioic acid, 1,10-decanedioic acid, dodecanedioic acid and 1,4-cyclohexanedicarboxylic acid;

the hydroxylation reagent is at least one selected from the group consisting of 1,2,3,4,5-pentitol, 1,2,3,4,5,6-hexanehexol and 2,2-dihydroxymethyl-butanol; and the hydroxyl value of the hydroxyl-terminated polyester resin is 20-30 mgKOH/g, and the acid value of the hydroxyl-terminated polyester resin is 1-8 mg KOH/g.

2. The hydroxyl-terminated polyester resin according to claim 1, wherein the melt viscosity of the hydroxyl-terminated polyester resin at 200° C. is 9,000-13,000 mPa·s.

3. The hydroxyl-terminated polyester resin according to claim 1, wherein the catalyst is an organic tin catalyst.

4. A coating comprising the hydroxyl-terminated polyester resin of claim 1.

5. A method for preparing the hydroxyl-terminated polyester resin according to claim 1, comprising the following steps of:

(a) carrying out a polycondensation reaction of the diol, dibasic acid, glycidyl tertcarbonate, and catalyst in an inert atmosphere to obtain a primary polymer;

(b) when the acid value of the primary polymer obtained in step (a) is 10-25 mgKOH/g, vacuumizing and then continuing the polycondensation reaction to obtain a condensation polymer; and (c) when the acid value of the condensation polymer obtained in step (b) is 8-15 mgKOH/mg, carrying out a hydroxylation reaction until the acid value of the product obtained by the hydroxylation reaction is 1-8 mgKOH/g and the hydroxyl value of the product is 20-30 mgKOH/g, at this moment, adding an antioxidant, and then mixing to obtain the hydroxyl-terminated polyester resin.

6. The method for preparing the hydroxyl-terminated polyester resin according to claim 5, wherein the degree of vacuum of the vacuumizing in step (b) is in a range of 0.08 MPa to 0.1 MPa.

7. A coating comprising the hydroxyl-terminated polyester resin prepared according to the method of claim 5.

8. The method for preparing the hydroxyl-terminated polyester resin of claim 5, wherein the catalyst is an organic tin catalyst.

9. The method for preparing the hydroxyl-terminated polyester resin of claim 5, wherein the temperature of the polycondensation reaction of step (a) is in a range of 230° C. to 240° C.

10. The method for preparing the hydroxyl-terminated polyester resin of claim 5, wherein the time of the polycondensation reaction of step (a) is in a range of 3 hours to 5 hours.

11. The method for preparing the hydroxyl-terminated polyester resin of claim 5, wherein the time of the polycondensation reaction of step (b) is in a range of 50 minutes to 120 minutes.

12. The method for preparing the hydroxyl-terminated polyester resin of claim 5, wherein the temperature of the hydroxylation reaction in step (c) is in a range of 215° C. to 230° C. and the time of the hydroxylation reaction in step (c) is in a range of 1 hour to 3 hours.

13. The method for preparing the hydroxyl-terminated polyester resin of claim 5, wherein the temperature of the mixing in step (c) is in a range of 200° C. to 230° C. and the time of the mixing in step (c) is in a range of 10 minutes to 40 minutes.

* * * * *